United States Patent [19]
Powell et al.

[11] Patent Number: 5,264,678
[45] Date of Patent: Nov. 23, 1993

[54] WELD-BEAD PROFILOMETER

[75] Inventors: Bradley W. Powell, Athens; Larry Z. Kennedy, Huntsville; Ivan A. Burroughs, Gurley, all of Ala.

[73] Assignee: Applied Research, Inc., Huntsville, Ala.

[21] Appl. No.: 765,880

[22] Filed: Sep. 26, 1991

[51] Int. Cl.$^5$ .............................................. B23K 9/095
[52] U.S. Cl. ........................... 219/130.01; 219/124.34; 356/376
[58] Field of Search ................... 219/130.01, 124.34, 219/137 R; 318/577; 356/376

[56] References Cited

U.S. PATENT DOCUMENTS

| | | | |
|---|---|---|---|
| 4,328,416 | 5/1982 | Dudley et al. | 318/577 |
| 4,410,787 | 10/1983 | Kremers et al. | 219/124.34 |
| 4,649,426 | 3/1987 | Bolstad | 219/137 R |
| 4,652,133 | 3/1987 | Antoszewski et al. | 219/124.34 |
| 4,859,829 | 8/1989 | Dufour | 219/124.34 |
| 4,900,886 | 2/1990 | Bridges | 219/10.55 E |

FOREIGN PATENT DOCUMENTS 650749  3/1979  U.S.S.R. ............... 219/124.34

Primary Examiner—Clifford C. Shaw
Attorney, Agent, or Firm—John C. Garvin, Jr.; James E. Staudt

[57] ABSTRACT

An optoelectronic sensor for measuring the profile of a weld seam or weld bead along a line perpendicular to the seam or bead. The sensor illuminates a workpiece with a pulsed and shaped laser beam which is flattened in one dimension and fan shaped in a second dimension. An image of the workpiece is transmitted optically to a CCD camera the electronic shutter of which is synchronized with the pulses of the illuminating laser beam. A signal providing data relating to the profile of the workpiece is transmitted by the CCD camera to an automated welding device for response to the data. The sensor is intended to be a part of a highly automated welding system, in which it will be used in automatic tracking of the seam or automatic profiling of the weld bead for immediate evaluation and assurance of quality during the welding process. The sensor is also used as a quality control tool in reviewing the profile of a weld after it has been formed. The device includes structure for deflecting welding contaminants away from its exposed optical windows.

12 Claims, 3 Drawing Sheets

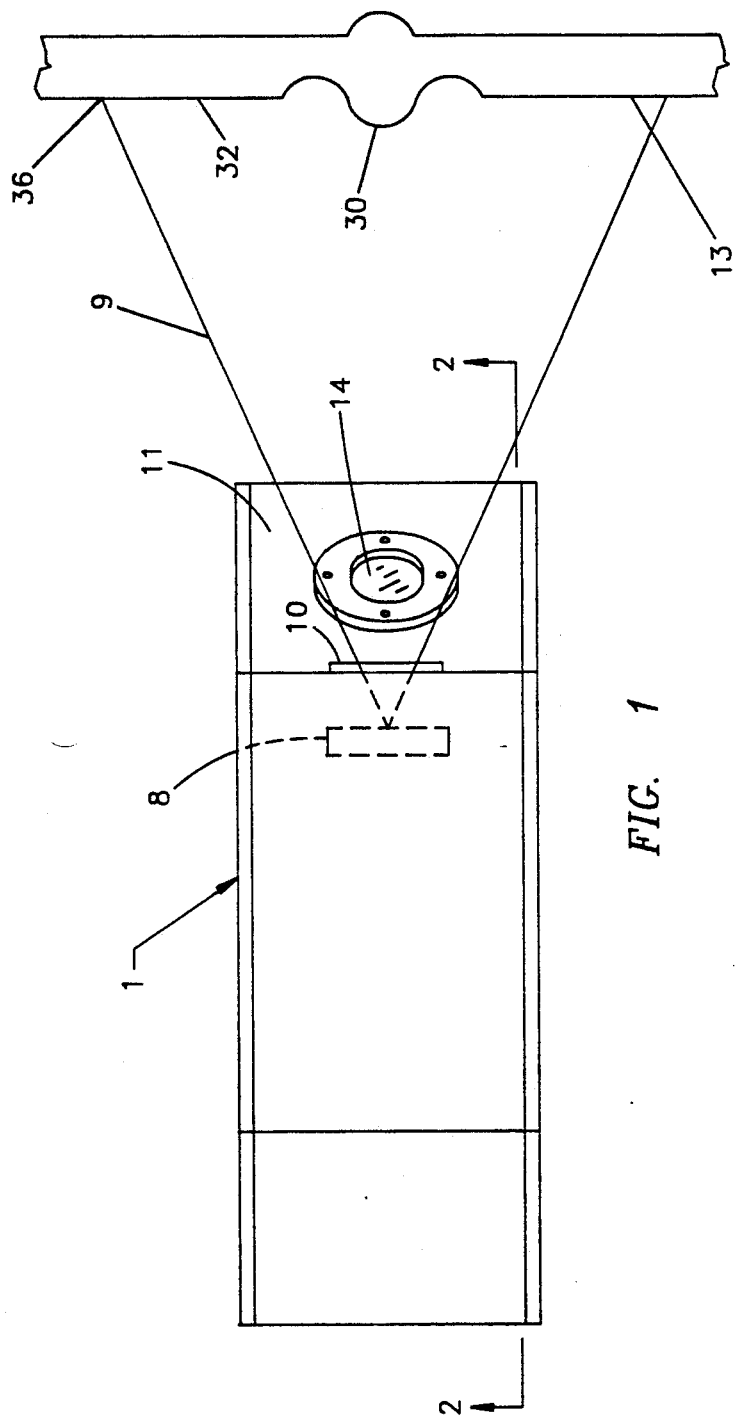
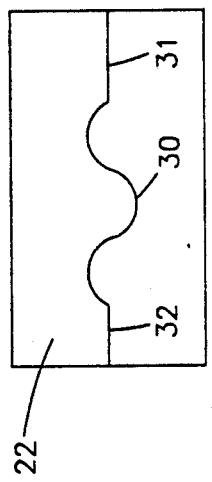
FIG. 3
FIG. 1

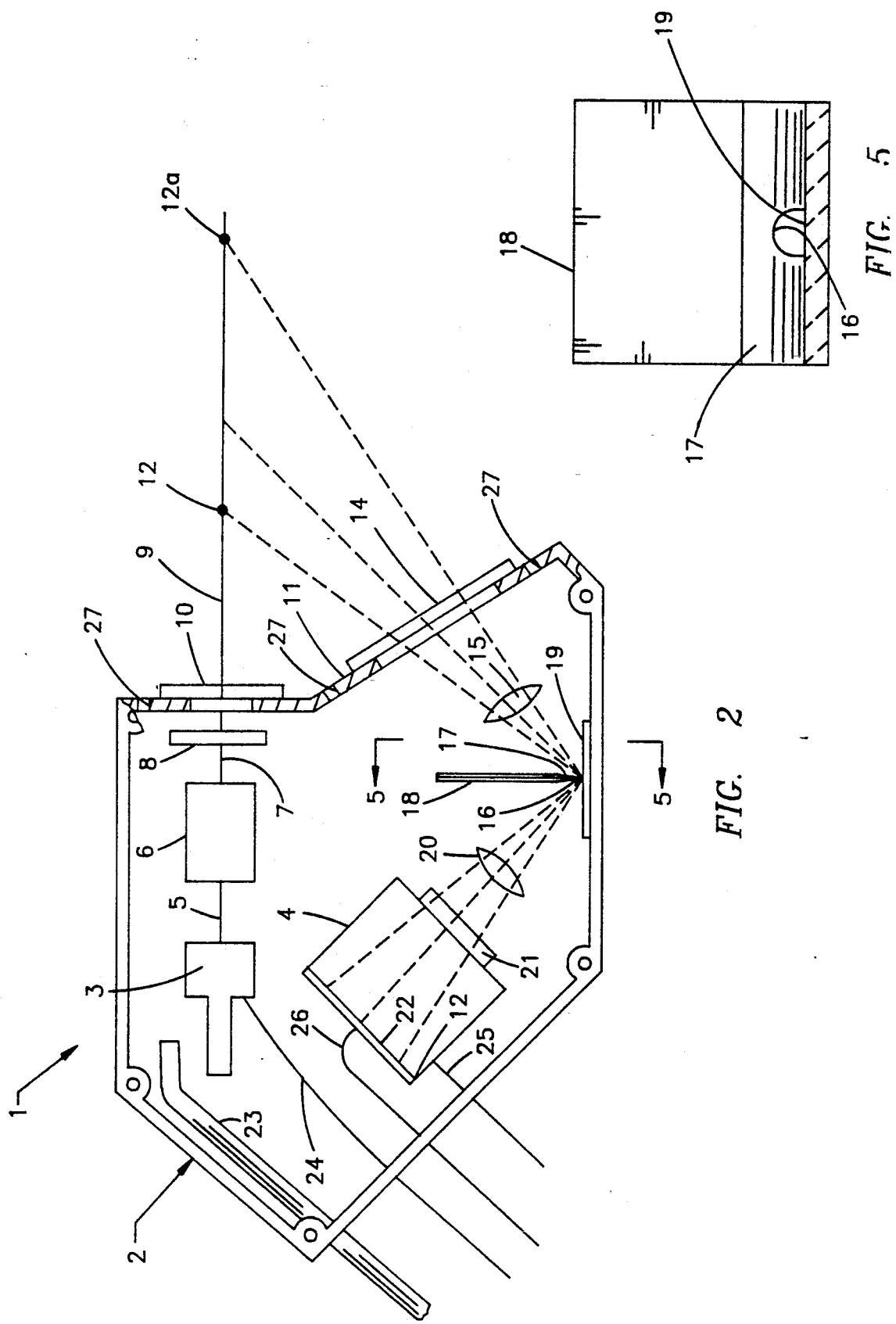

WELD-BEAD PROFILOMETER

BACKGROUND OF THE INVENTION

1. Field of the Invention

The present invention relates to an optoelectronic sensor for measuring the profile of a weld seam or weld bead along a line perpendicular to the seam or bead. The sensor is intended to be a part of a highly automated welding system, in which it will be used in automatic tracking of the seam or automatic profiling of the weld bead for evaluation and assurance of quality during or after the welding process.

2. Description of the Prior Art

Heretofore sensors utilized in conjunction with automated welding systems have been large and relatively heavy. These characteristics are of course quite undesirable in equipment for automatic welding systems.

An even greater deficiency of prior art sensors for automatic welders is their inability to reject optical noise created by the proximity of the sensor to the welding arc. A further deficiency of prior art sensors is the frequent contamination of critical components by the splatter and by-products produced by the welding operation.

Examples of related prior art are found in U.S. Pat. Nos. 4,410,787 to Kremers et al., 4,724,302 to Penney et al. and 4,816,640 to Sugitani et al. Each of these patents shows profiling devices which utilize image processing to control the profile configuration of a weld. In addition the patent to Kremers et al. shows the use of a pulsed lighting device to illuminate the area of a weld which is to be profiled. However, neither the above cited patents nor any known prior art provides a compact profile sensor contained within a single housing and having the unique optics, and illumination capabilities of that disclosed and claimed herein.

SUMMARY OF THE INVENTION

According to the invention there is provided a weld-bead profile sensor (profilometer) capable of eliminating the above-mentioned drawbacks of the prior art and of providing a compact sensor which is much less affected by such optical noise as the light from the welding arc. The sensor of the present invention is also much less affected by the contaminants from the welding process adhering to its critical components.

The sensor illuminates a line across a weld bead with a pulsed, fan shaped beam of light from a laser diode. The pulses are of very short duration with a high peak power. Light reflected from the illuminated are is imaged in a Charge-Coupled Device (CCD) camera, the shutter of which can be opened for extremely short periods of time. The laser pulse is synchronized with the opening of the shutter to maximize the amount of laser light integrated, while simultaneously keeping the open time short to minimize the amount of arc light integrated. The net effect is to decrease the noise level by several orders of magnitude below that of prior sensors.

The sensor operates in conjunction with a video digitizer and a computer. By use of a geometric transformation based on the position and orientation of the camera with respect to the fan of light and the work-piece, the computer generates a transverse profile of the weld from the image in the camera. The profile has a depth resolution of greater than 0.001 in. (0.025 mm) and a transverse resolution of greater than 0.002 in. (0.05 mm). The sensor weighs only about 1.5 lb. (0.7 kg.). It acquires 30 profiles per second. It can operate in the presence of strong electromagnetic interference that is typical of a manufacturing environment. The laser is controlled automatically.

It is therefore an object of the present invention to provide a weld-bead profile sensor capable of providing the above described features as well as more accurate and usable signals which accurately portray the actual configuration of the profile of either an area to be welded, an area as it is being welded or an area which has been previously welded.

It is another object of the invention to provide a weld bead profile sensor which is capable of tracking a seam to be welded.

It is another object of the invention to provide a weld bead profile sensor which is capable of the effective rejection of optical noise from the arc of a welding device.

It is another object of the invention to provide a weld bead profile sensor which is capable of deflecting contaminants away from the sensor during welding operations.

It is another object of the invention to provide a weld bead profile sensor which is capable of providing a thin fan shaped laser beam which provides an extremely bright illumination of an area to be welded.

It is another object of the invention to provide a weld bead profile sensor which provides a compact light weight profile sensor which is contained within a single housing.

Other objects and features of the present invention will become apparent from the following description taken in connection with the accompanying drawings.

BRIEF DESCRIPTION OF THE DRAWINGS

FIG. 1 is a top view of the present invention showing the housing which encloses the basic components of the device, the lateral illuminating beam configuration, and a work piece.

FIG. 2 is a sectional view of the invention taken along line 2—2 of FIG. 1.

FIG. 3 is an elevation view of a typical profile image as it is impinged upon the retina of the camera utilized in the present invention.

FIG. 5 is an enlarged sectional view taken along line 5—5 of FIG. 2.

DESCRIPTION OF THE PREFERRED EMBODIMENTS

Figure 4:
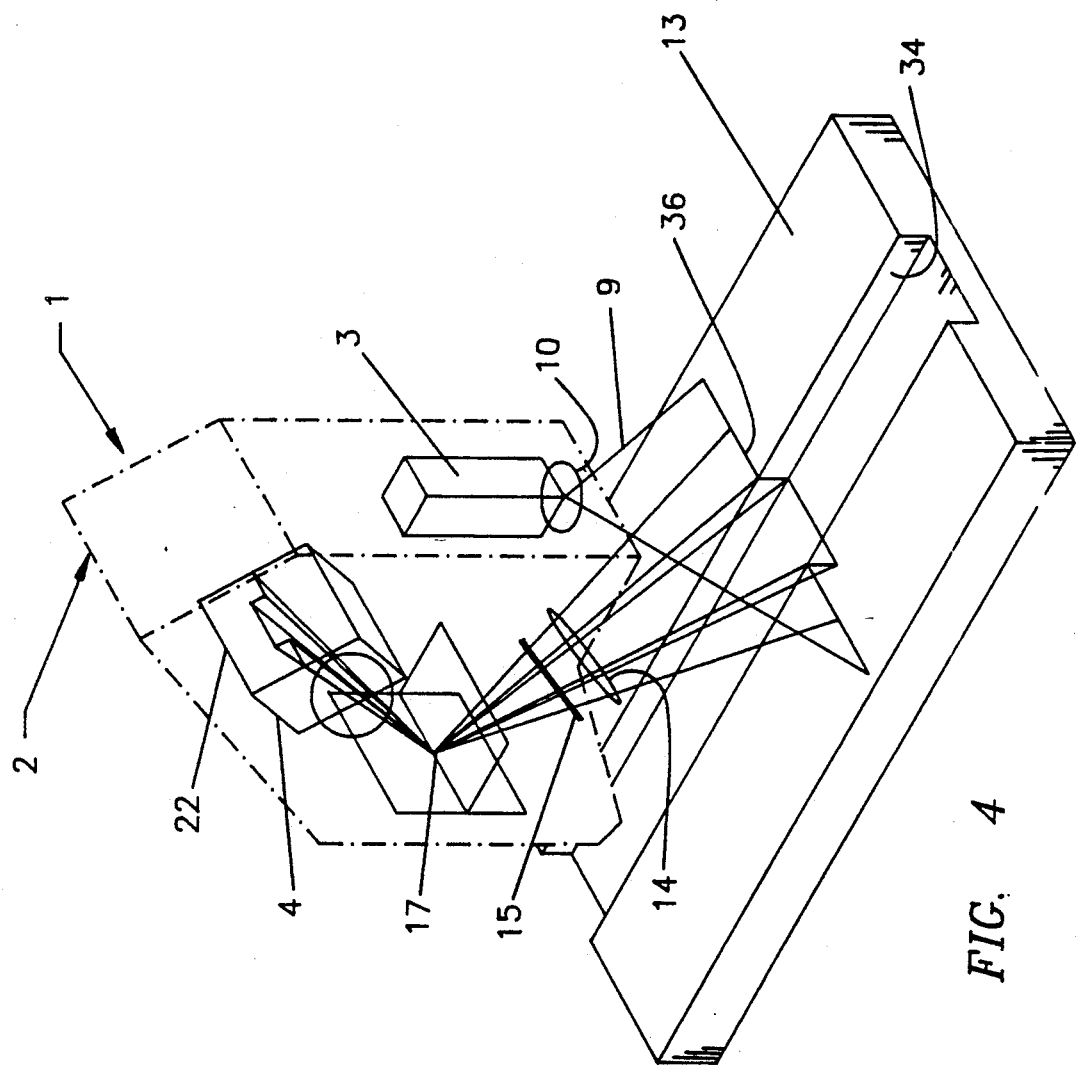
FIG. 4 is an orthographic projection illustrating in particular illuminating, as well as reflected light paths as they pass through the optics of the present invention.

As illustrated in FIG. 1, an optoelectronic sensor which is the subject of this invention is generally designated by the numeral 1. The sensor is packaged in a housing 2. For illustration, the housing 2 is shown in FIG. 2 in section taken along line 2—2 of FIG. 1, so as to show the housing with one side removed. This in addition to showing the location of the primary components which are mounted to the housing 2, FIG. 2 shows a side view of paths of illuminating and reflected light beams utilized in the present invention. As illustrated in FIG. 2 the device consists of two basic components: an array of laser-emitting diodes 3, and a (CCD) video camera 4.

CCD video cameras of the type used in the present invention are well known in the art and are available, for example from the "PULNiX" company of Sunnyvale, Calif. This type of camera utilizes an array of pixels as its retina. Each pixel is capable of emitting an electrical signal, the strength of which is proportional to the intensity of the light which illuminates the pixel.

The laser-emitting diodes 3 emit a beam of light 5. To minimize the adverse effects of a welding arc upon the light beam, the laser light frequency utilized is in the infrared range. The infrared light beam 5 passes into a series of focusing and collimating lenses (not shown) which are housed in a lens cabinet 6. These lenses produce a round beam 7 which passes through a cylindrical lens 8 which refracts the round beam into a fan shaped and flattened or planar beam 9 which exits through a window 10 formed in the front side or face 11 of the housing 2. If the planar beam 9 were visible it would appear, when viewed from above in a first dimension, as a triangle with a vertex at the cylindrical lens 8, (see FIG. 1); and if viewed from the side in a second dimension, the beam would appear as a line about the thickness of a sheet of paper (see FIG. 2). Referring to FIG. 2, the points 12 and 12A which are indicated on the planar beam 9 represent the field of view extremes which are defined by the optics which admit light reflections from the beam 9, to camera 4. The details of these optics will be described hereinafter. The reason for flattening and spreading out the beam 9 is to define a "stripe" of light which results when the laser light strikes a reflective surface, such as an aluminum or steel workpiece, which is to be welded. Thus, when a reflective surface such as a workpiece 13 (FIG. 1) intercepts the plane of illumination created by laser beam 9 between the extremes of the field of view (between points 12 and 12A) of the imaging optics, then some of the light will enter through a window 14 (FIG. 2), formed in the forward end 11 of housing 2. The light will then pass through a lens 15 which directs it to a semi-circular shaped aperture 16, formed in the tapered end 17 of plate 18. An enlarged view of the aperture 16 and its surrounding components is shown in FIG. 5. As the light passes through aperture 16, it is reflected by a mirror 19 through a lens 20, a filter 21 and onto the retina 22 of camera 4. As previously described, the retina 22 is formed of signal generating pixels (not shown). Thus a pixel at a given spot on the retina will register the intensity of the light which strikes that spot, and that pixel in conjunction with the electronics of the camera will produce an outgoing signal proportional to the intensity of the light. The filter 21 is matched in frequency spectrum with the laser diodes 3 so as to pass only light within the desired spectrum range, thus minimizing the passage of extraneous light such as that generated by a welding arc.

Also mounted to housing 2 is an input cooling line 23, an electrical input line 24 which supplies high voltage to the laser diode array 3, an electrical input line 25 which supplies low voltage to the CCD camera 4, and an output video supply line 26 which delivers signals generated by camera 4 to appropriate components (not shown) of an automated welding system. The coolant and electrical supply components are of conventional design and therefore are not illustrated. The incoming coolant is directed primarily to cool the high voltage laser diode array and secondarily to cool the remaining components within the housing 2. The coolant then passes through several carefully metered and strategically located exit ports 27. The coolant thus serves a unique additional function of providing pressurized coolant streams, which are precisely directed by the ports 27 to deflect contaminants, resulting from the welding process, away from the windows 10 and 14.

In addition to its primary function of viewing a weld as the weld is being formed, it should be noted that the sensor 1 is capable of acquiring sufficient information to produce tracking signals. In this capacity the sensor functions as a quality control device wherein the sensor is guided progressively along a weld while transmitting operative signals to ancillary equipment. An exceptionally detailed image of the profile of the completed weld is also transmitted. Such ancillary equipment may include video displays, computers, recording devices and any other devices capable of utilizing the output signals of the sensor. It will be noted that FIG. 1 illustrates the invention as it illuminates (through the window 10 with beam 9), a completed weld-bead 30, which has been formed on workpiece 13. The sensor simultaneously views the reflected image of line 36 through window 14. The reflected image of the profile of a completed weld such as is illustrated in FIG. 1, is shown in FIG. 3 as it impinges upon retina 22 of camera 4. Thus the profile line 31, as illustrated in FIG. 3, is the image of the profile of the workpiece 13 (including the weld-bead 30) across the line 36 illuminated by the beam 9. It will be understood that all lateral points, such as an arbitrarily selected point 32, indicated on the workpiece in FIG. 1 and on the retina in FIG. 3, make up the profile image line 31 on the retina. Accordingly, after appropriate calibration of the sensor, any such points on either the workpiece or the retina may be accurately located on the other.

In FIG. 4, an orthographic projection most clearly illustrates the beam paths in relation to the optics of the sensor 1. For clarity the beam paths have been illustrated with heavy lines. The numerals employed in FIG. 4, depict similarly identified components as identified in FIGS. 1-3 with the exception of the groove 34 which is formed in workpiece 13 and the configuration of the line 36 which is created by the laser beam 9 as it strikes workpiece 13. In calibrating the device, care is taken to position the beam 9 in a perpendicular relationship to the workpiece as viewed from the side. Positioning the device also includes the setting of a perpendicular relationship between the line 36 and the direction of travel of the device as it moves along the work piece. For purpose of illustration of the depth recognition capability of the sensor the groove 34 is shown as a rectangle formed in the workpiece 13. The operation of the device is based upon the principle of an invertible mapping from the points of the plane defined by the retina of the camera to the points of the plane of emitted laser light. The geometry of the light paths is illustrated in FIG. 4. In mathematical terms there is a one-to-one correspondence between the points illuminated by the laser and the points on the surface of the retina of the camera. Therefore, knowing that a given pixel is registering a given value of brightness allows one to deduce that a given spot on the surface of the workpiece is being illuminated by the laser. The set of all bright pixels is the profile of the object being measured. Multiplying the matrix (whose column vectors are the vertical and horizontal coordinates of all the bright pixels on the CCD retina) by a homogeneous transformation matrix (which mathematically models the internal components of the sensor) will result in a third matrix (whose column vectors will be the range coordinates and the lateral coordinates of the set of points at the intersection of the plane of illumination and the surface of the object being measured.

In operation, the sensor 1 is first precisely positioned with respect to the workpiece 13 as described above. The array of infrared laser diodes 6 illuminates a line perpendicularly across the weld bead 30 with a pulsed, fan shaped laser beam of infrared light. In one specific example of the operation of the device of the present invention, beam pulses are approximately 200 ns long with a peak power of approximately 200 Watts. Light reflected from the illuminated area is imaged in the (CCD) camera 4, the electronic shutter of which can be opened during times as short as 100 ns. The laser pulse is synchronized with the opening of the shutter to maximize the amount of laser light integrated, while simultaneously keeping the opening time short so as to reduce the amount of arc light integrated. In this way the noise level is reduced to approximately 1/600 of that of prior devices. Additionally, as the device is operated coolant is forced into the housing 2 through line 23 and serves not only to cool the internals of the sensor but also to deflect welding contaminants away from windows 10 and 14 as the coolant is passed through the metered holes 27 which are strategically positioned around the windows.

I claim:

1. An optoelectronic sensor for illuminating a predetermined area of a weld as the weld is formed on a workpiece, for optically viewing the profile of said illuminated area and for providing usable signals in response to the configuration of said profile, said sensor comprising:

a housing;

means for illuminating the cross sectional profile of a selected portion of the area of the workpiece being welded;

optical means, including a camera, for optically transmitting an image of the illuminated cross sectional profile of said illuminated area upon the retina of said camera, and a mirror attached to said housing, and a plate abutting one edge thereof to said mirror, said plate having an aperture formed in said abutting edge, said mirror and said aperture being disposed to reflect focused light emitting from said workpiece to said camera;

illuminator power supply means for supplying power to said illuminating means;

camera power supply means for supplying power to said camera;

signal output means attached to said camera for providing output signals in response to the configuration of the image of said cross sectional profile as it is impinged upon the retina of said camera.

2. A sensor as set forth in claim 1 wherein said illuminating means includes;

an array of infrared laser diodes, disposed to provide predetermined timed pulses of infrared laser light;

means for converting said laser light into a fan shaped beam in a first dimension and into a thin flattened line shaped beam in a second dimension.

3. A sensor as set forth in claim 2 wherein said camera includes an electronic shutter, the opening of which is synchronized with the timed pulses generated by said illuminating means.

4. A sensor as set forth in claim 3 wherein said beam defines a line of light upon the weld area of said workpiece.

5. A sensor as set forth in claim 4 wherein said beam in one dimension is disposed in a generally perpendicular relation to said workpiece and to the direction in which said sensor moves over said workpiece.

6. A sensor as set forth in claim 5 wherein the duration of said beam pulses is between 100 ns and 300 ns.

7. A sensor as set forth in claim 6 wherein the duration of the opening of said electronic camera shutter is between 100 ns and 300 ns.

8. A sensor as set forth in claim 7 wherein the peak power of said beam pulses is between 100 watts and 300 watts.

9. A sensor as set forth in claim 1 wherein said housing completely surrounds said illuminating means and said optical means, and wherein said housing includes window means disposed to pass light from said illuminating means and to said optic means.

10. A sensor as set forth in claim 1 wherein said housing includes cooling means for directing coolant to the illuminating means and to the optical means.

11. A sensor as set forth in claim 10 wherein said housing is provided with strategically positioned metered ports disposed to vent said coolant so as to deflect welding contaminants away from said window means of said sensor.

12. A sensor as set forth in claim 1 wherein said abutting edge of said plate is tapered.

* * * * *